US012731010B2

(12) United States Patent
Nguyen et al.

(10) Patent No.: US 12,731,010 B2
(45) Date of Patent: Sep. 8, 2026

(54) MULTIVARIABLE TIME-SERIES FEATURE EXTRACTION

(71) Applicants: International Business Machines Corporation, Armonk, NY (US); MASSACHUSETTS INSTITUTE OF TECHNOLOGY, Cambridge, MA (US)

(72) Inventors: Lam Minh Nguyen, Ossining, NY (US); Wang Zhang, Cambridge, MA (US); Subhro Das, Cambridge, MA (US); Alexandre Megretski, Acton, MA (US); Luca Daniel, Cambridge, MA (US)

(73) Assignees: INTERNATIONAL BUSINESS MACHINES CORPORATION, Armonk, NY (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 838 days.

(21) Appl. No.: 18/160,737

(22) Filed: Jan. 27, 2023

(65) Prior Publication Data

US 2024/0256837 A1 Aug. 1, 2024

(51) Int. Cl.
*G06N 3/0464* (2023.01)
*G06N 3/063* (2023.01)

(52) U.S. Cl.
CPC ........... *G06N 3/0464* (2023.01); *G06N 3/063* (2013.01)

(58) Field of Classification Search
CPC ............................ G06N 3/0464; G06N 3/063
See application file for complete search history.

(56) References Cited

U.S. PATENT DOCUMENTS

2019/0354836 A1 11/2019 Shah
2022/0050944 A1* 2/2022 Shintani ................. G06N 3/045
2022/0058240 A9 2/2022 Cheng

FOREIGN PATENT DOCUMENTS

CN 108182259 B 6/2018
CN 109002917 A 12/2018

(Continued)

OTHER PUBLICATIONS

Zhicheng Cui et al., Multi-Scale Convolutional Neural Networks for Time Series Classification, May 11, 2016, arXiv:1603.06995v4 (Year: 2016).*

(Continued)

*Primary Examiner* — David Yi
*Assistant Examiner* — Paul Coleman
(74) *Attorney, Agent, or Firm* — Amin, Turocy & Watson, LLP

(57) ABSTRACT

One or more computer processors create a fully convolution network (FCN) comprising a plurality of 1×1 convolutions. The one or more computer processors append linear mapping layer (LM) to created FCN. The one or more computer processors capture a plurality of features utilizing multi-scale dilated convolutional kernels from the linear mapped FCN (LM-FCN). The one or more computer processors apply an average pool layer to the captured plurality of features along a temporal axis of a dilated convolutional kernel within the LM-FCN. The one or more computer processors predict a classification for subsequent time-series data utilizing the pooled plurality of features.

20 Claims, 8 Drawing Sheets

(56) References Cited

FOREIGN PATENT DOCUMENTS

| | | | |
|---|---|---|---|
| CN | 109034054 | B | 12/2018 |
| CN | 110751169 | A | 2/2020 |
| CN | 112329524 | A | 2/2021 |
| CN | 114169394 | A | 3/2022 |

OTHER PUBLICATIONS

Zhiguang Wang et al., Time Series Classification from Scratch with Deep Neural Networks: A Strong Baseline, Dec. 14, 2014 (Year: 2014).*

Author: Emma Rocheteau et al.; Title: Temporal Pointwise Convolutional Networks for Length of Stay Prediction in the Intensive Care Unit; Date: Feb. 24, 2021; arXiv:2007.09483v4; (Year: 2021).*

"Dataset listing," Time Series Classification Website, pp. 1-8, printed Oct. 17, 2022. <http://www.timeseriesclassification.com/dataset.php>.

Fawaz et al., "Inception Time: Finding AlexNet for Time Series Classification," Data Mining and Knowledge Discover, 34, pp. 1936-1962, 2020, Springer. <https://link.springer.com/article/10.1007/s10618-020-00710-y>.

Tan et al., "Time Series Extrinsic Regression," Welcome to the Monash, UEA & UCR Time Series Extrinsic Regression Repository, pp. 1-4, printed Oct. 17, 2022. <http://tseregression.org/>.

Tang et al., "Omni-Scale CNNs: A Simple and Effective Kernel Size Configuration for Time Series Classification," Published as a conference paper at ICLR 2022, pp. 1-17. <https://arxiv.org/abs/2002.10061>.

Wang et al., "Time Series Classification from Scratch with Deep Neural Networks: A Strong Baseline," 2017 International Joint Conference on Neural Networks (IJCNN), 2017, pp. 1578-1585, IEEE.

"Rethinking the Convolutional Structure for Time Series Problems," Inventor Conference Paper Submission, May 2022, 15 pages. Grace Period.

* cited by examiner

500

| *Datasets* | LM raw data | w/o LM normalized data |
|---|---|---|
| AppliancesEnergy | 2.732 | 2.825 |
| AustraliaRainfall | 8.019 | 8.031 |
| BIDMC32HR | 9.770 | 9.565 |
| BIDMC32RR | 3.578 | 3.130 |
| BIDMC32SpO2 | 3.763 | 3.805 |
| BeijingPM10Quality | 90.770 | 91.523 |
| BeijingPM25Quality | 56.328 | 57.299 |
| BenzeneConcentration | 1.335 | 1.754 |
| Covid3Month | 0.04358 | 0.04273 |
| FloodModeling1 | 0.00503 | 0.00519 |
| FloodModeling2 | 0.00314 | 0.00337 |
| FloodModeling3 | 0.00502 | 0.00513 |
| HouseholdPowerConsumption1 | 40.001 | 45.480 |
| HouseholdPowerConsumption2 | 34.126 | 32.090 |
| IEEEPPG | 23.381 | 25.149 |
| LiveFuelMoistureContent | 42.101 | 42.108 |
| NewsHeadlineSentiment | 0.142 | 0.142 |
| NewsTitleSentiment | 0.138 | 0.138 |
| PPGDalia | 10.258 | 11.048 |

| Dilations | 0 | 4 | 9 | 18 |
|---|---|---|---|---|
| RF | 16 | 72 | 142 | 268 |
| Threshold frequency(Hz) for 80% spectral power in CAM | 79 | 27 | 9 | 2 |
| Testing Accuracy | 0.4467 | 0.6950 | 0.8520 | 0.924 |

| Dataset | Method | Average rank | Average accuracy |
|---|---|---|---|
| UEA 30 archive | vanilla FCN | 6.2667 | 0.5944 |
| | MLSTN-FCN | 4.4667 | 0.7150 |
| | InceptionTime | 3.4000 | 0.7668 |
| | OS-CNN | 3.5000 | 0.7607 |
| | LM-FCN0 | 3.5333 | 0.7613 |
| | LM-FCN1 | 3.5667 | 0.7647 |
| | LM-FCN2 | 3.2667 | 0.7615 |
| TSER archive | Method | Average rank | Average normalized RMSE |
| | vanilla FCN | 4.5789 | 0.5102 |
| | MLSTN-FCN | 5.2105 | 0.5910 |
| | InceptionTime | 5.9474 | 0.6870 |
| | OS-CNN | 3.4211 | 0.2133 |
| | LM-FCN0 | 2.2632 | 0.1160 |
| | LM-FCN1 | 3.3158 | 0.1262 |
| | LM-FCN2 | 3.2632 | 0.1650 |

FIG. 8

MULTIVARIABLE TIME-SERIES FEATURE EXTRACTION

STATEMENT REGARDING PRIOR DISCLOSURES BY THE INVENTOR OR A JOINT INVENTOR

The following disclosure(s) are submitted under 35 U.S.C. 102(b)(1)(A):

(i) Rethinking the Convolutional Structure for Time Series Problems; Lam Minh Nguyen, Wang Zhang, Subhro Das, Alexandre Megretski, Luca Daniel; and May 1, 2022.

BACKGROUND

The present invention relates generally to the field of machine learning, and more particularly to convolutional neural networks.

Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

SUMMARY

Embodiments of the present invention disclose a computer-implemented method, a computer program product, and a system. The computer-implemented method includes one or more computer processers creating a fully convolution network (FCN) comprising a plurality of 1×1 convolutions. The one or more computer processors append linear mapping layer (LM) to created FCN. The one or more computer processors capture a plurality of features utilizing multi-scale dilated convolutional kernels from the linear mapped FCN (LM-FCN). The one or more computer processors apply an average pool layer to the captured plurality of features along a temporal axis of a dilated convolutional kernel within the LM-FCN. The one or more computer processors predict a classification for subsequent time-series data utilizing the pooled plurality of features.

BRIEF DESCRIPTION OF THE DRAWINGS

FIG. 5 is a table, in accordance with an embodiment of the present invention;

FIG. 7 is a table, in accordance with an embodiment of the present invention; and FIG. 8 is a table, in accordance with an embodiment of the present invention.

DETAILED DESCRIPTION

Figure 1:
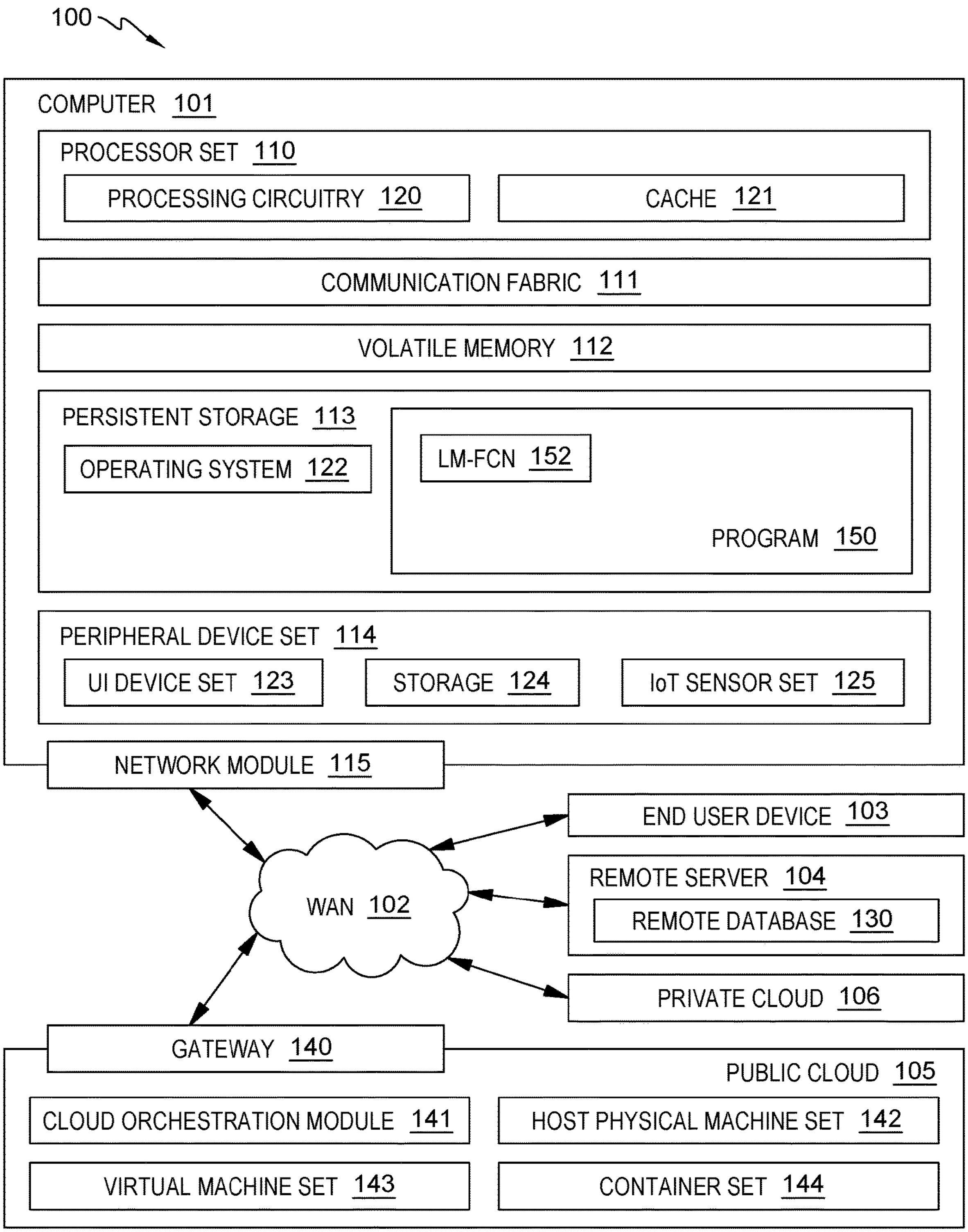
FIG. 1 is a functional block diagram illustrating a computing environment, in accordance with an embodiment of the present invention.

Time-series data is ubiquitous in daily life and appears in numerous practical applications, including many industrial domains ranging from health care to finance. The time-series problem involves analyzing and understanding the evolution of synchronous variables, which has attracted increasing interest as synchronous variables are essential for generalizing system knowledge for a plurality of tasks, such as classification, forecasting and regression. It is critical for efficient systems to develop and utilize accurate and effective algorithms to extract the feature and information from such datasets. Further, the algorithms need to be scalable and efficient, often, different time-series datasets would require different structures and domain knowledge to tailor algorithms.

Analyzing time-series data with deep learning methods has shown great success in recent years. However, the state-of-the-art deep learning time-series models are mostly inspired by successful architectures from other domains, such as computer vision with minor customization on time-series data. Other than a few strong baseline models that utilize fully convolutional networks, the gold standard model for this area is not yet established. Similar to other machine learning domains, deep learning approaches are getting increasing attention in time-series problems. Despite some success in generalizing complex systems, many of the successful deep neural network (DNN) structures in the time-series domain directly borrow backbone models from other domains (e.g., computer vision/NLP (natural language processing)), such as Fully Convolutional Neural Networks (FCN), with only minor modifications on hyper-parameters.

In many of the machine learning tasks, inputs are well structured with uniform or similar meanings among all values. For instance, images consist of pixel values and language models interpret word tokens into continuous embeddings. This is not the case for time-series data, especially when variables are collected in separate individual channels and do not share similar physics-based meaning or distribution. Therefore, pre-processing of the time-series data is necessary for the multi-variate scenarios to extract essential features and balance the effects from different variables before being fed into a deep learning model. For image input, the information is mostly encoded in the spatial domain therefore CNN filters naturally extract the local features among the neighborhood pixels. While for time-series data, interaction between longer term time-steps might occur, such as periodic trends or delayed causal relationship, making vanilla convolutional kernels incapable to capture these phenomena.

Embodiments of the present invention improve neural networks by incorporating time-series specific characteristics including long range interactions and multivariate couplings. Embodiments of the present invention propose a LM-FCN (locally mapping fully convolutional network), achieving state-of-the-art performance on both regression and classification tasks, as shown in FIG. 8. Embodiments of the present invention identify critical components by experimenting with the hyper-parameters for a strong FCN baseline model. Embodiments of the present invention provide a solution to multivariate couplings and long-range interaction, improving the FCN by extracting information between different features within the same time-step ahead of convolution layers; automatically identifying proper normalization for different features; and utilizing multi-scale kernels and dilations to expand the reception field of convolutional layers to allow long distance interaction among variables. Embodiments of the present invention introduce a novel local mapping (LM) layer, providing a learnable method to map the single time-step multivariate variables, hereinafter "multivariates", into an interpretable space, allowing improved feature extraction. Embodiments of the present invention outperform the current SOTA algorithms on time-series regression problems. Embodiments of the present invention recognize that given the sequential ordering and synchronous nature of the time-series data, the present invention demonstrates special structures customized for the time-series domain. Implementation of embodiments of the invention may take a variety of forms, and exemplary implementation details are discussed subsequently with reference to the Figures.

The present invention will now be described in detail with reference to the Figures.

FIG. 1 depicts computing environment 100 illustrating components of computer 101 in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Computing environment 100 contains an example of an environment for the execution of at least some of the computer code involved in performing the inventive methods, such as program 150. In addition to program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 4. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip". In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in program 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Program 150 is a program, a subprogram of a larger program, an application, a plurality of applications, or mobile application software, which functions to extract features in multivariable time-series. In various embodiments, program 150 may implement the following steps: creating a fully convolution network (FCN) comprising a plurality of 1×1 convolutions; appending linear mapping layer (LM) to created FCN; capturing a plurality of features utilizing multi-scale dilated convolutional kernels from the linear mapped FCN (LM-FCN); applying an average pool layer to the captured plurality of features along a temporal axis of a dilated convolutional kernel within the LM-FCN; and predicting a classification for subsequent time-series data utilizing the pooled plurality of features. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over WAN 102. In various embodiments, client versions of program 150 resides on any other computing device (not depicted) within computing environment 100. Program 150 is depicted and described in further detail with respect to FIG. 2.

Locally mapping fully convolutional network (LM-FCN) 152 is representative of one or more fully convolutional networks that include an appended global average pooling layer before the last dense layer without any pooling operation between convolution layers. In an embodiment, LM-FCN 152 is utilized by program 150 to extract information between different features within the same time-step ahead of convolution layers; automatically identify the proper normalization for the different features; and provide long distance interaction among variables through multi-scale kernels and dilations that expand the reception field of convolutional layers to map the single time-step multivariates into an interpretable space. LM-FCN 152 provides a backbone structure for time-series problems.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Figure 2:
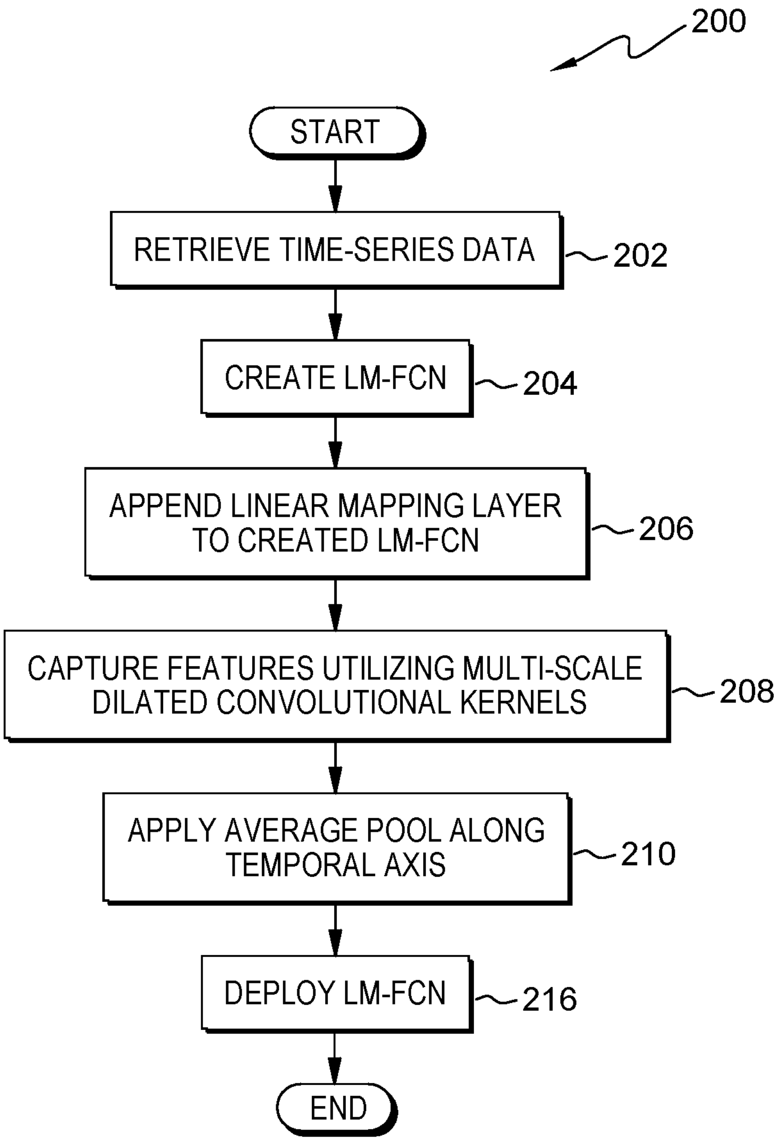
FIG. 2 is a flowchart depicting operational steps of a program, on a computer within the computing environment of FIG. 1, for extracting features in multivariable time-series, in accordance with an embodiment of the present invention.

FIG. 2 depicts flowchart 200 illustrating operational steps of program 150 for extracting features in multivariable time-series, in accordance with an embodiment of the present invention.

Program 150 receives time-series data (step 202). In an embodiment, program 150 initiates responsive to a set of multivariate time-series data. In an embodiment, program 150 denotes the set of multivariate time-series (MTS) data as $X=\{x_1, x_2 \ldots x_T\}$, $x_i \in \mathbb{R}^M$, i=1, . . . , T comprising of T time-indexed measurements with variable dimension M. For example, program 150 receives or retrieves a set of time-series data containing healthcare data such as patient vital time-series records (e.g., body temperature, pulse rate, respiration rate, blood pressure).

Program 150 creates a locally mapped fully convolutional network (LM-FCN) (step 204). In an embodiment, program 150 initializes or utilizes a pre-trained fully convolution network (FCN) (i.e., baseline LM-FCN 152). In an embodiment, the FCN is a network that does not contain any dense layers, while comprising 1×1 convolutions. Responsive to time-series data, program 150 inputs the time-series data into LM-FCN 152, where LM-FCN 152 is modified as discussed in step 206-210.

Figure 3:
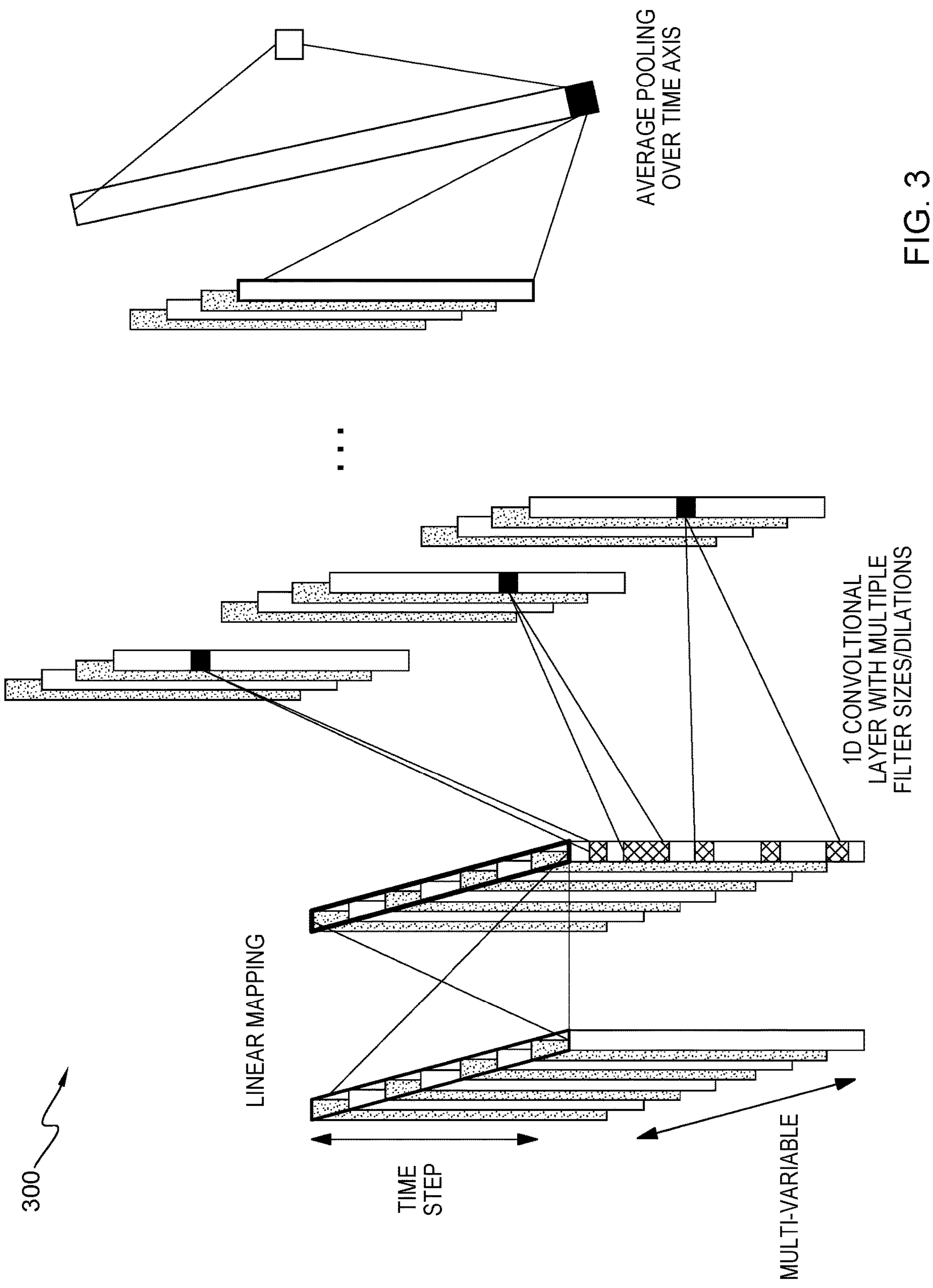
FIG. 3 is an illustration of a locally mapping fully convolutional network within the computing environment of FIG. 1, in accordance with an embodiment of the present invention.

Program 150 appends linear mapping layer to created FCN (step 206). In an embodiment, program 150 appends a simple linear mapping layer with weight $W \in \mathbb{R}^{M \times M}$ and bias $b \in \mathbb{R}^M$ to LM-FCN 152, as shown in FIG. 3. In this embodiment, program 150 utilizes the appended linear mapping layer to allow direct interaction between the multivariates within a same time-step. In another embodiment, for each input $X=\{x_1, x_2 \ldots x_T\}$, program 150 utilizes the linear mapping to operate over a variable vector within same time-step. In a further embodiment, program 150 outputs the concatenation of all the mapped results, s.t:

$$\tilde{x} = Wx_t + b, \text{ for } t \in \{1, 2, \ldots, T\}, \qquad 1)$$

$$a_0 = \{\tilde{x}_1, \tilde{x}_2, \ldots, \tilde{x}_T\}$$

with respect to equation (1), where $a_0$ serves as the input for the convolutional layers.

Program 150 captures features utilizing multi-scale dilated convolutional kernels (step 208). In an embodiment, program 150 utilizes kernels to extract certain features from time-series data, where the kernel is manipulated to focus on different regions of the time-series. In an embodiment, program 150 adjusts a receptive field of 1D CNN of L layers is defined as:

$$RF = 1 + \sum_{i=1}^{L} \left( \max_{j \in K_i}(\{RF_{i,j}\}) - 1 \right), \qquad 2)$$

with respect to equation (2), where $RF_{i,j}$ denotes the view window of jth kernel in ith layer and $K_i$ corresponds to the number of filters with different sizes in ith layer.

$$RF_{i,j} = k_{i,j} + (k_{i,j} - 1) * d_{i,j}$$

for kernel with size $k_{i,j}$ and dilation $d_{i,j}$. In an embodiment, LM-FCN 152 comprises a three convolutional layer configuration with channels {128, 256, 128} respectively. In an embodiment, program 150 customizes kernel sizes to adapt to different time scales. In another embodiment, program 150, for the first and second convolutional layer, utilizes {3, 8, 40, 80} as kernel sizes with each of them accounting for ¼ of the output channels. For the last convolutional layer, program 150 utilizes {1, 2} as kernel sizes.

In an embodiment, program 150 utilizes filter sizes of {8, 5, 3} respectively for the three convolutional layers without dilation. In an embodiment, the RF is $$(1 + (8 - 1) + (5 - 1) + (3 - 1)) = 14$$

and the value from the first step interacts at most with the eighth step value in the first convolution and at most the 14th value after all three convolutions. In an embodiment, if the time scale of interaction is beyond 15 steps, then program 150 does not capture that feature. In an embodiment, if the window size is too large, the filters can overfit the neural network since LM-FCN 152 parameters are proportional to the filter size.

Program 150 applies an average pool along temporal axis (step 210). In an embodiment, program 150 applies pooling layer that averages along the temporal axis of a kernel, as described in step 208, so that the averaged output size does not vary against input time-steps instead of applying on each channel then the output vector size has the same dimension T. In this embodiment, program 150 average pools to calculate the average value for portions of the captured features from step 208 and responsively create a pooled set of features or a down sampled feature map. In an embodiment, if a temporal dimension of the time-series data is smaller than the classification categories, then the transferred information is insufficient for classification task. For most of the regression tasks when output is a single scalar, the large step size is unnecessary as well.

Program 150 deploys LM-FCN (step 212). In an embodiment, program 150 deploys modified LM-FCN 152 to a plurality of production, test, and auxiliary environments. In an embodiment, said testing environments are structured and created to mimic associated production environments. In this embodiment, said testing environments duplicate system/computational resources, system tools/programs, and dependencies available to an associated production environment. In another embodiment, test and auxiliary environments are structurally, systemically, and programmatically indistinguishable from production environments. In various embodiments, program 150 utilizes deployed LM-FCN 152 to predict subsequent unknown (e.g., unlabeled) time-series datapoints (e.g., finance, healthcare, etc.). In an example, program 150 utilizes LM-FCN 152 to predict propane compression based on dynamic time-series data (e.g., temperature, pressure, flow, etc.) inputted by a plurality of sensors comprised within a propane compressor. Here, program 150 adjusts the propane compressor based on predictions from deployed LM-FCN 152.

Further Embodiments

Analyzing time-series data with deep learning methods has shown great success in recent years. However, the state-of-the-art deep learning time-series models are mostly inspired by successful architectures from other domains such as computer vision with minor customization on time-series data. Other than a few strong baseline models that utilizes fully convolutional network or ResNet, the gold standard model for this area is not yet established.

Embodiments of the present invention improve network structures by incorporating time-series specific characteristics like long range interactions and multivariate couplings. Embodiments of the present invention propose a LM-FCN (locally mapping fully convolutional network), achieving state-of-the-art performance (top average rank) on both regression and classification tasks.

Time-series data is ubiquitous in daily life and appears in numerous practical applications, including many industrial domains ranging from health care to finance. The time-series problem is to analyze and understand the evolution of synchronous variables, which has attracted an increasing interest as said variables are essential for generalizing the system knowledge in many tasks like classification, forecasting and regression. It is important to develop accurate and effective algorithms to extract the feature and information from such datasets. Further, the algorithms need to be scalable and efficient. Often times, different time-series datasets would require different structures and domain knowledge to tailor the algorithms.

Similar to other machine learning domain, deep learning approaches are getting increasing attention in time-series problems. Despite some success in generalizing complex systems, many of the successful DNN structures in the time-series domain directly borrow the backbone models from other domains (e.g., computer vision/NLP (natural language processing)), such as ResNet or Fully Convolutional Neural Networks (FCN), with only some modification on hyper-parameters. Given the sequential ordering and synchronous nature of the time-series data, embodiments of the present invention demonstrate special structures customized for this domain.

Embodiments of the present invention explore such critical components by experimenting with the hyper-parameters for a strong FCN baseline model. Embodiments of the present invention provide a solution to multivariate couplings and long-range interaction, improving the FCN by extracting information between different features within the same time-step ahead of convolution layers; automatically identifying proper normalization for different features; and utilizing multi-scale kernels and dilations to expand the reception field of convolutional layers to allow long distance interaction among variables.

Embodiments of the present invention systematically demonstrate performance on the sensitivity of FCN hyper-parameters. Different from state-of-the-art (SOTA) models using large kernel sizes to expand the view window, embodiments of the present invention found that similar performance can be achieved with dilated CNN layers to effectively expand the receptive field without increasing kernel size.

The present invention introduces a novel LM (local mapping) layer, providing an elegant and learnable way to map the single time-step multivariates into an interpretable space, allowing better feature extraction.

Based on the above observation, embodiments of the present invention propose a new structure LM-FCN, extensively evaluated on benchmark datasets. The experimental results show that the present invention outperforms the current SOTA algorithms on time-series regression problems and is competitive against other SOTA models on time-series classification problems.

Drawing upon the insights obtained from the analyses, embodiments of the present invention show what necessary features are required to potentially define a "backbone" structure for time-series problems.

One classical approach is the distance-based method measuring the similarity between two temporal sequences, and NN-DTW (nearest neighbor Dynamic Time Warping) is the most popular method in this area. To extract different representation from the time-series data, feature-based methods are customized to learn one or more patterns. Bag-of-SFA-Symbols (BOSS) analyzes the frequency domain occurrence and tags the distance by Symbolic Fourier Approximation (SFA) histograms. Using the discriminative subsequences known as "sharpelets" that search for the short recurrent patterns. Another popular family of approaches on time-series problem called COTE (Collective Transformation-based Ensemble), which combines the classifiers built on different representations. The drawback of these feature-based method is the requirement on heavy feature engineering and high computational complexity, making them less scalable to the applications that come with large-scale data. Comparing with DL-base methods, the classical approaches require many theoretical assumptions on data distribution and are less flexible due to smaller model capacity against DNNs.

As time-series data stack on the temporal dimension, Convolutional Neural Networks (CNNs) naturally adapt to arbitrary time-steps and extracts the features along the time axis, with a 1D sliding window filtering the neighborhood information. Noticeably, similar to image processing, these CNN based methods heavily rely on the pooling operations to reduce the parameter number in the last dense layer. To address this issue, embodiments incorporate the idea of FCN and append a global average pooling layer before the last dense layer without any pooling operation between convolution layers, largely reducing the weight number and preventing over-fitting for CNNs. FCN still remains one of the strongest baselines in time-series problems.

In the parallel research direction of CNN structure, Recurrent Neural Network (RNN)'s iterative enhancement process also favors the time-series data. With the classical recurrent approaches facing the issue of vanishing/exploding gradient, recent works RNN on time-series data usually couple with CNN to capture the spatio-temporal effects.

Considering the different time scales in the TS data, multi-scaling/varying receptive fields is widely adopted in 1D-CNN to improve the generalization for TS data with various meaningful time constants. MCNN uses heavy pre-processing to extract features in both temporal and frequency domain following the local and full convolution stage. A more intuitive way is to use different filters sizes in a parallel manner. In the Inception block, three convolution kernels with size {10, 20, 40} are used to adapt the model to features of different lengths. In a more recent work, which studied the model performance with varying receptive field size over the UCR 85 dataset and found single uniform receptive field size can significantly outperform others. Based on this observation, embodiments of the present invention introduce Omni-scale CNN, consisting of convolution filters with multiple prime numbers.

Embodiments of the present invention denote a multivariate time-series (MTS) data as $X=\{x_1, x_2 \ldots x_T\}$, $x_i \in \mathbb{R}^M$, $i=1, \ldots, T$ consisting of T time-indexed measurements with variable dimension M. Embodiments of the present invention predict a continuous value y or a classification one-hot label $Y \in \mathbb{R}^C$ with $Y_i$ being 1 if X belongs to the ith category of total C classes, otherwise 0. The former problem is referred as TSER (time-series extrinsic regress) and the latter as TSC (time-series classification). The name TSER was first introduced to differentiate with TSF (Time-series Regression) which usually means regressing previous time data into future forecasting such as predicting $y_t$ from $y_t-1$. In an embodiment, for both TSER and TSC problems, although the input X is ordered by time sequence, the output y neither necessarily indicates a future value nor heavily depends on recent values.

In many of the machine learning tasks, the input is well structured with uniform or similar meanings among all the values. For instance, images consist of pixel values and language models interpret word tokens into continuous embeddings. This is not the case for time-series data, especially when variables are collected in separate individual channels and does not share a similar physics-based meaning or distribution. Therefore, a pre-processing of the time-series data is necessary for the multi-variate scenario to extract the essential features and balance the effects from different variables before feeding them into the deep learning model.

With most of the SOTA time-series deep learning models based on the CNN structure, the convolutional layer is directly applied on the temporal dimension ahead of any other operations. This 1D filter approach paves the path for variables to interact among neighborhood time-steps, while it inevitably cuts off the direct communication along the variable axis within the same step. Although the later convolutional layers could make up for the connection between different variables to certain extent, such an operation involves all the parameters being connected to those variables and therefore is not elegant and prone to overfitting.

For image input, the information is mostly encoded in the spatial domain therefore CNN filters naturally extract the local features among the neighborhood pixels. While for time-series data, interaction between longer term time-steps might occur, such as periodic trends or delayed causal relationship, making vanilla convolutional kernels incapable to capture these phenomena.

Embodiments of the present invention append a simple linear mapping layer with weight $W \in \mathbb{R}_{M \times M}$ and bias $b \in \mathbb{R}^M$, as shown in FIG. 2. Program 150 utilizes the linear mapping layer to allow direct interaction between the multivariates within the same time-step. In an embodiment, for each input $X=\{x_1, x_2 \ldots x_T\}$, program 150 utilizes the linear mapping operating over the variable vector within same step and the output is the concatenation of all the mapped results, s.t:

$$\tilde{x} = Wx_t + b, \text{ for } t \in \{1, 2, \ldots, T\}, \qquad 3)$$

$$a_0 = \{\tilde{x}_1, \tilde{x}_2, \ldots, \tilde{x}_T\}$$

with respect to equation (3), where $a_0$ serves as the input for the convolutional layers.

The receptive field of 1D CNN of L layers is defined as:

$$RF = 1 + \sum_{i=1}^{L}\left(\max_{j \in K_i}(\{RF_{i,j}\}) - 1\right),$$

with respect to equation (4), where $RF_{i,j}$ denotes the view window of jth kernel in ith layer and $K_i$ corresponds to the number of filters with different sizes in ith layer.

$$RF_{i,j} = k_{i,j} + (k_{i,j} - 1) * d_{i,j}$$

for kernel with size $k_{i,j}$ and dilation $d_{i,j}$.

In an embodiment, program 150 utilizes filter sizes of {8, 5, 3} respectively for the three convolutional layers without dilation. The RF is $$(1 + (8 - 1) + (5 - 1) + (3 - 1)) = 14$$

and the value from the first step could interact at most with the eighth step value in the first convolution and at most the 14th value after all three convolutions. In this case, if the time scale of interaction is beyond 15 steps, then the neural network is not capable to capture that feature. Embodiments of the present invention recognize that if the window size is too large, the filters can overfit the neural network since the neural network parameters are proportional to the filter size. Further parametric study is shown in the experiments section.

Embodiments of the present invention (i.e., LM-FCN (denoted as LM-FCN0)) comprise a three convolutional layer configuration with channels {128, 256, 128} respectively. In an embodiment, program 150 customizes kernel sizes to adapt to different time scales. In another embodiment, program 150, for the first and second convolutional layer, utilizes {3, 8, 40, 80} as kernel sizes with each of them accounting for ¼ of the output channels. For the last convolutional layer, program 150 utilizes {1, 2} as kernel sizes.

In prior implementations, the average pooling layer is applied on each channel then the output vector size has the same dimension T. Embodiments recognize that such method does not work well with extreme short nor with longer data series lengths. If the temporal dimension of the time-series data is smaller than the classification categories, then the transferred information is insufficient for classification task. For most of the regression tasks when output is a single scalar, the large step size is unnecessary as well. Therefore, embodiments employ the pooling layer averaging along the temporal axis, so that the averaged output size does not vary against input time-steps.

Embodiments of the present invention were evaluated on both regression and classification tasks. The datasets and training parameters are explained in the following. The train parameters might differ considering the size of training dataset and actual training time, but the setup is consistent across all comparison neural networks for each dataset. For each of the experiments, embodiments of the present invention ran five random seeds and reported the average of the best testing results from the five experiments. Embodiments of the present invention utilized a single graphic card for all the computation.

Regression: Embodiments of the present invention utilized a TSER dataset consisting of a total of 19 datasets covering a plurality of fields including Energy Monitoring, Environment Monitoring, Health Monitoring, Sentiment Analysis and Forecasting. For the majority of the datasets, the present invention used training parameters with a batch size of 16 and a learning rate of 0.001 for 200 epochs. For three small, embodiments of the present invention utilize 2000 epochs to fully train the model. For larger datasets, embodiments of the present invention utilize 256 as batch size to reduce training time.

Classification: For classification task, embodiments of the present invention focus on the multivariate time-series classification archive from UEA including 30 datasets. Embodiments of the present invention utilize batch size of 16, learning rate of 0.0001 for 200 epochs for all the classification tasks.

Figure 4:
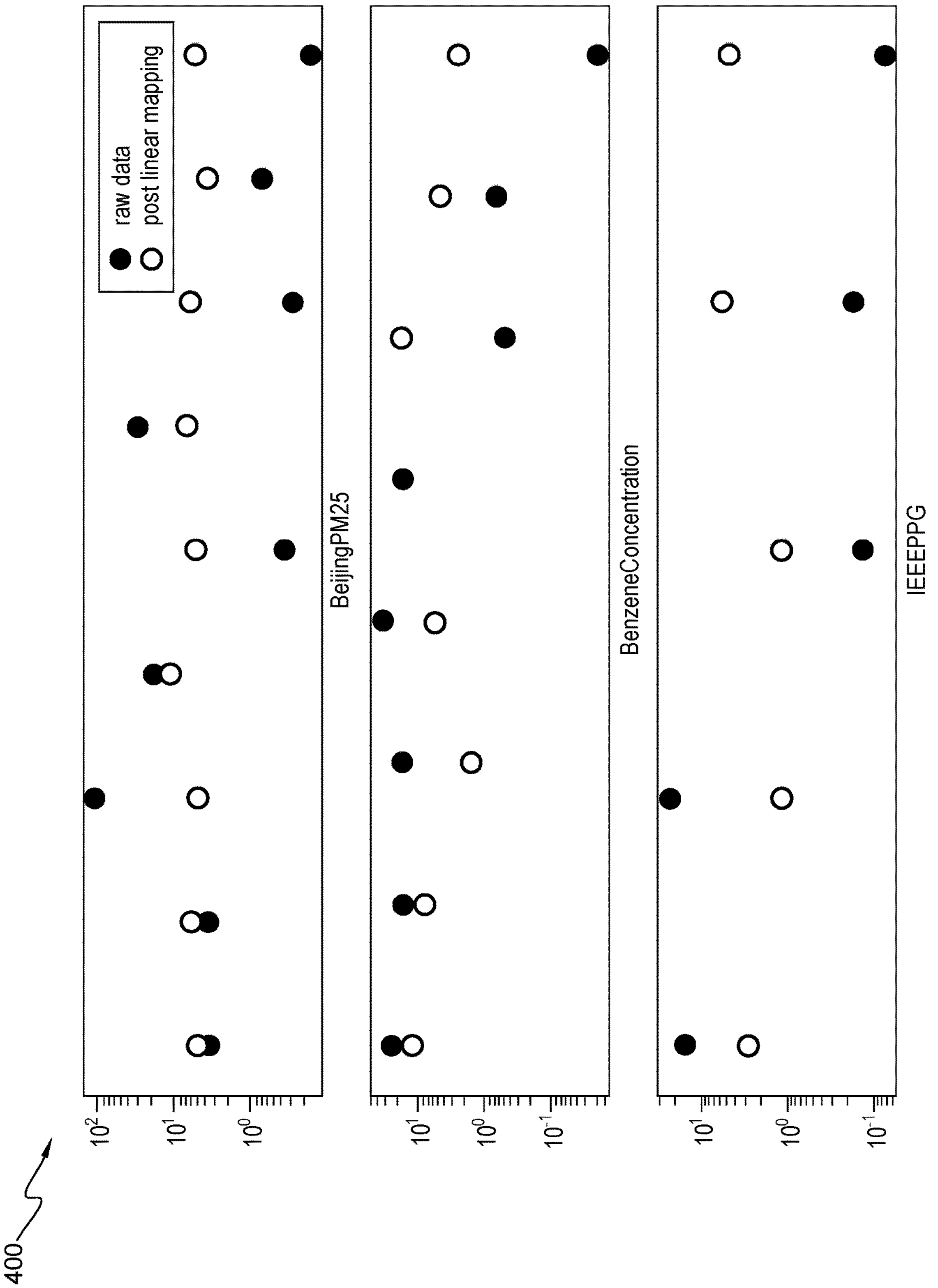
FIG. 4 is a plurality of charts, in accordance with an embodiment of the present invention.

FIG. 4 shows the standard deviation of each input variable from the raw data and its processed mapping after the trained linear layer, for three regression tasks. Embodiments of the present invention recognize that the y-axis is in log scale and the raw data variable differ widely in the standard deviation, ranging from 1e−1 to 1e3. Such variance introduces additional challenge to the optimization during the training process. With the linear layer, program 150 automatically regulates the variances and effectively serves as a preconditioner for normalizing the data into proper range.

To evaluate the effect besides normalization, embodiments of the present invention compare two modeling setups on the TSER dataset. In an embodiment, embodiments of the present invention delete the linear mapping layer from LM-FCN 152 and applies it on the pre-normalized data and compares the performance with LM-FCN 152 on raw data. The normalization is applied on each variable dimension, s.t:

$$\bar{x}_{t,m} = \frac{x_{t,m-\mu m}}{\sigma_m},\ \text{for } t \in \{1, 2, \ldots, T\},\ m \in \{1, 2, \ldots M\} \tag{5)}$$

with respect to equation (5), where $\mu_m$ and $\sigma_m$, are, respectively, the mean and standard deviation of mth variable over the entire dataset.

The average RMSE is shown in FIG. 5. Embodiments of the present invention recognize that the proposed linear mapping performs better even on raw data than the latter method on normalized data, with smaller RMSE on the majority of the 19 datasets. Besides the normalization effect, embodiments of the present invention conjecture that the direct interaction among the variables within the same time-step also contribute to model performance.

In an embodiment, program 150 utilizes three convolutional layers with 8, 5, 3 as fixed kernel sizes with channel sizes {128, 256, 128}. Other embodiments propose multiple kernels with larger size like {10, 20, 40} and many prime numbers to capture the features under various time scales. In order to explore on the sensitivity of model performance with respect to max kernel size and channel number, embodiments of the present invention conducted parametric experiments on regression and classification tasks. The largest filter sizes vary among {8, 14, 20, 40, 80}. Here, program 150 keeps the {3, 8} kernels consisting of half of the output channels and only change the other two larger kernels. As for the output channel, the present invention evaluated sizes among {24, 64, 128}. In general, embodiments of the present invention found that larger max kernel sizes lead to better performance, indicating the impact of longer time effects in most of the time-series problems. The only exception here is the BeijingPM25Quality. For two of the classification tasks embodiments recognize the significant drop in performance in the case of large channel sizes. This phenomenon is more obvious on larger filter sizes due to overall model size. With layer parameter number proportional to the multiplication of channel and kernel sizes, large kernels are more vulnerable to over-fitting.

Based on these observations, embodiments of the present invention propose LM-FCN1, slightly modified from LM-FCN0, where the channel size of first and second convolutional layers are inverse proportionally reduced if the max kernel size exceeds 8.

In some embodiments, the large receptive field in Equation (1) could be achieved by increasing either the kernel size or dilation, but the latter does not enlarge the model size. Based on this, embodiments of the present invention evaluated model performance with fixed maximum kernel size 8 and different dilations and compared the results with dense kernels of similar receptive field. Embodiments of the present invention selected dilations of {0, 4, 9, 18} to get the effective single layer receptive field similar to the dense kernels under fixed channel sizes. In this embodiment, performance improves with increasing dilations in 7 of the 9 datasets. The dilated layers achieve comparable or even better results with the models of large dense kernels. Embodiments of the present invention propose LM-FCN2, with fixed channel sizes 234 as LM-FCN0 and fixed maximum kernel size 8. In another embodiment, the present invention introduces dilation for ¼ of the kernels with size 4 and 9 to effectively increase the time-window of the convolutional network.

To further study why small receptive field compromises the model performance in extracting long term information, embodiments of the present invention manipulated a toy classification problem. The goal of the learned classifier (i.e., program 150) is to identify the dominant frequency given a temporal signal data consisting of noises of other frequencies. Such a problem could be easily addressed by analyzing the maximum frequency domain response from FFT (Fast Fourier Transform). Practically, more complicated information other than frequency might exist in the time-series data and the current SOTA deep learning models do not naturally adapt to such features.

For each example, embodiments of the present invention drew a dominant frequency $f_{tg}$ from c candidate frequencies and assign it a larger amplitude compared with others. The synthetic signal S as a function of time t is, $$S(t) = \sum_{i=1}^{c} = A_i \sin(2\pi f_i t) + \in(t), \tag{6)}$$

with respect to equation (6), where $f_i$ is the frequency with corresponding amplitude $A_i$ and $\epsilon(t)$ is a random noise following normal distribution N(0,1).

A typical signal with dominant $f_{tg}$=9 Hz is in shown in the upper figure in FIG. 7. Embodiments of the present invention evaluated 4 different dilation settings for the proposed LM-FCN model with dilation={0, 4, 9, 18}, corresponding to receptive size {18, 74, 144, 298} for 3 convolutional layers. The average accuracy among 5 random seeds is in FIG. 6. In an embodiment the kernel size constant, an increase in dilation could massively improve the model performance. The class activation map (CAM) for the target frequency class among 4 models and associated Fourier transform are shown in the middle and bottom subplot of FIG. 7. As recognized from the temporal CAM, large dilation spreads its attention over the entire time axis with a drop at the beginning and ending section where the raw data has large shifting. In the frequency domain, embodiments of the present invention found the amplitude of large dilation model CAMs to mostly concentrate on lower frequencies. Embodiments of the present invention calculates the threshold frequency containing 80% of spectral power, as shown in FIG. 7. FIG. 7 shows that models with small filters have wide spectral energy distribution. This is exactly as expected because higher frequencies consisting of random noise do not contribute to the classification. Without large receptive field, the convolutional layer could only extract information from neighborhood pixels, corresponding to the smaller periodic patterns in CAM. Although the toy example is based on synthetic data, it serves to accentuate the problems of distracting frequencies in using FCN with small receptive field to extract longer term effects in time-series problems.

Figure 6:
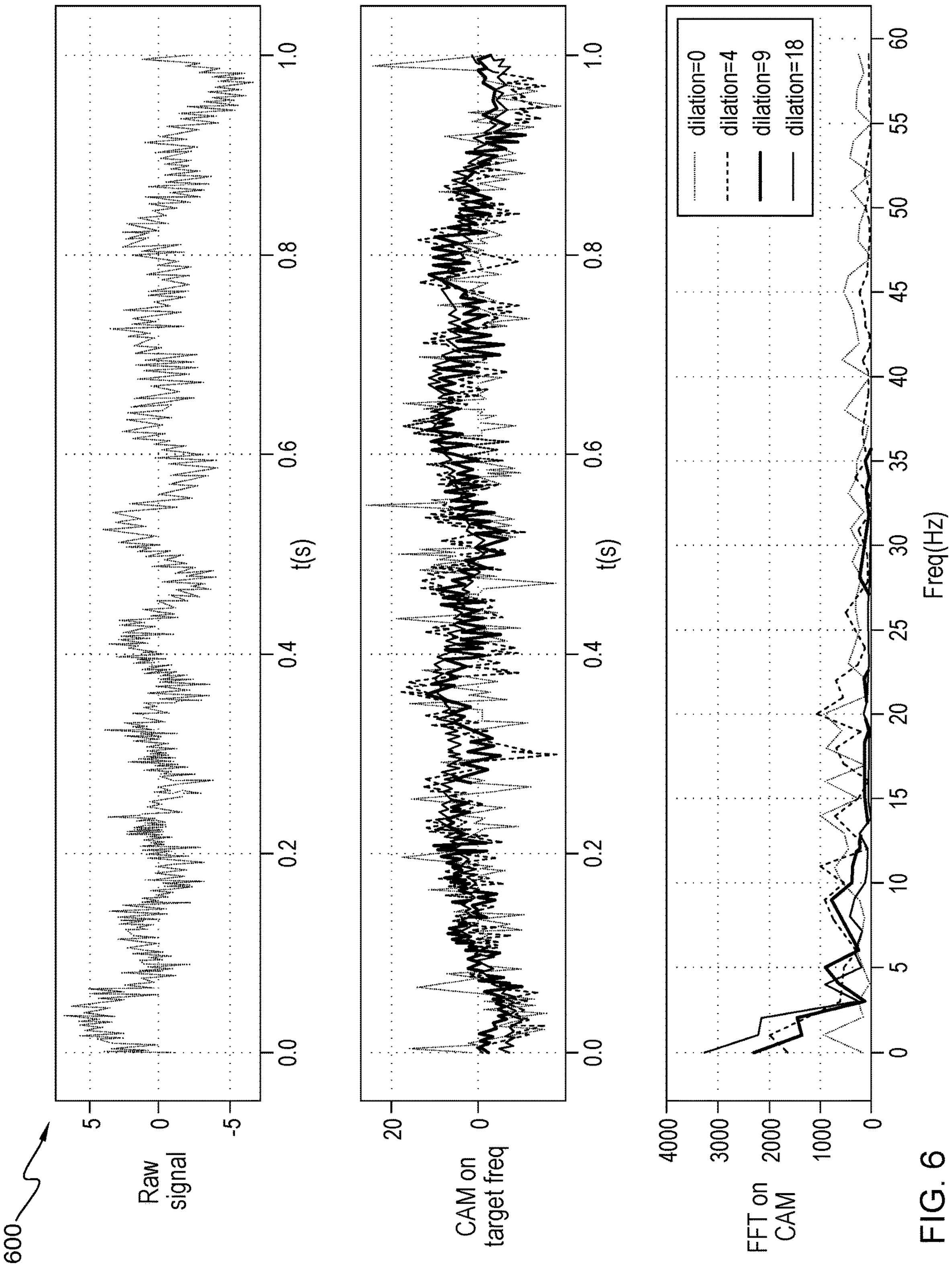
FIG. 6 is a plurality of charts, in accordance with an embodiment of the present invention.

The structures for all the above benchmarks follow the standard setup from the present invention reran the experiments under the same training schedule across all the models. For classification, embodiments of the present invention compare the average accuracy and rank of each model. For regression, embodiments of the present invention compare the min-max normalized RMSE and average rank. The summary of results is shown in FIG. 6. The proposed LM-FCN outperforms all other models for regression tasks. For classification task, embodiments of the present invention achieve similar performance with existing SOTA models.

Embodiments of the present invention raised concerns on using classical convolutional network on time-series problems. Although time-series data can be viewed as 1D image with multiple channels, there are two patterns that require special treatments. First, the multivariates within the same step are recorded synchronously, there exist close interactions between these multivariates that necessitates direct feature extraction. Second, other than the local temporal effect there could be additional information that may be encrypted in longer time windows. To improve on the performance of the SOTA models, designing special architectures acknowledging these two patterns are critical to further understand the time-series data.

Based on these observations, the presented invention (i.e., LM-FCN), a novel neural network structure for the multivariate time-series problems, leveraging the direct interaction among variables within same time-step and large receptive field from dilated kernel. Embodiments of the present invention achieve the best performance over the existing SOTA models on regression tasks and yields competitive results on classification tasks.

FIG. 3 depicts illustration 300 comprising a locally mapping fully convolutional network within the computing environment of FIG. 1, in accordance with an embodiment of the present invention. Illustration 300 illustrates an appended linear mapping layer with weight $W \in \mathbb{R}^{M \times M}$ and bias $b \in \mathbb{R}^{M}$, as discussed in step 206.

FIG. 4 depicts charts 400 comprising a plurality of charts, in accordance with an embodiment of the present invention. Charts 400 demonstrate standard deviation of variables for 3 regression datasets. Charts 400 show the standard deviation of each input variable from the raw data and its processed mapping after the trained linear layer, for three regression tasks. In charts 400, the y-axis is in log scale and the raw data variable differs widely in the standard deviation, ranging from 1e-1 to 1e3.

FIG. 5 depicts table 500 comprising a plurality of charts, in accordance with an embodiment of the present invention. Table 500 shows average RMSE associated with respective testing sets. Table 500 shows that the proposed linear mapping performs better even on raw data than the latter method on normalized data, with smaller RMSE on the majority of the 19 datasets. Besides the normalization effect, embodiments of the present invention conjecture that the direct interaction among the variables within the same time-step also contribute to model performance.

FIG. 6 depicts charts 600 comprising a plurality of charts, in accordance with an embodiment of the present invention. Charts 600 shows class activation map (CAM) for the target frequency class among 4 models and associated Fourier transforms. Charts 600 demonstrate a typical signal with dominant $f_{tg}$=9 Hz is in shown in the raw signal figure. The results in charts 600 were from 4 tested different dilation settings for LM-FCN 152 with dilation={0, 4, 9, 18}, corresponding to receptive size {18, 74, 144, 298} for the 3 convolutional layers.

FIG. 7 depicts table 700 comprising a table, in accordance with an embodiment of the present invention. Table 700 shows the calculated the threshold frequency containing 80% of spectral power. Table 700 shows that models with small dilations have wide spectral energy distribution.

FIG. 8 depicts table 800 comprising a plurality of charts, in accordance with an embodiment of the present invention. Table 800 is a summary of results of a plurality of benchmarks of embodiments of the present invention compared with existing SOTA models. Table 800 compares the average accuracy and rank of each model. For regression, table 800 compares the min-max normalized RMSE and average rank. The proposed LM-FCN outperforms all other models for regression tasks. For classification task, embodiments of the present invention achieves similar performance with existing SOTA models. Table 800 demonstrates that LM-FCN0, LM-FCN1, and LM-FCN2 (i.e., embodiments of the present invention) achieve a better rank (i.e., lower is better) than any tested method while retaining greater accuracy with a lower average normalized RMSE.

What is claimed is:

1. A computer-implemented method for classifying multivariate time-series data, the method comprising:

creating, by a system comprising at least one processor, a fully convolution network (FCN) comprising a plurality of 1×1 convolutions;

appending, by the system, a linear mapping layer (LM) to the FCN to create a locally mapped fully convolutional network (LM-FCN), wherein the LM is configured as a per-time-step local mapping that receives, at each time-step, a vector of M variables and computes a mapped vector by multiplying the vector of M variables by a square weight matrix having dimensions M by M and adding a bias vector having M elements, such that the mapped vector enables direct interaction and normalization between the M variables prior to any temporal convolution;

capturing, by the system, a plurality of features utilizing multi-scale dilated convolutional kernels from the LM-FCN, the multi-scale dilated convolutional kernels including kernels having at least two different dilation factors along a temporal axis to expand an effective receptive field without increasing kernel sizes;

applying, by the system, an average pool layer comprising a global average pooling operation to the captured plurality of features along the temporal axis of a dilated convolutional kernel within the LM-FCN to produce a length-invariant pooled feature representation while reducing a number of trainable parameters relative to a fully connected layer; and predicting, by the system, a classification for subsequent multivariate time-series data utilizing the length-invariant pooled feature representation.

2. The computer-implemented method of claim 1, wherein the LM-FCN comprises a three convolutional layer configuration.

3. The computer-implemented method of claim 2, wherein the three convolutional layer configuration has respective numbers of output channels {128, 256, 128}, as determined by a hyper-parameter sensitivity analysis.

4. The computer-implemented method of claim 2, wherein a first and a second convolutional layer both utilize kernel sizes of {3, 8, 40, 80}, each kernel size being assigned to a distinct subset of channels, such that shorter kernels capture local patterns and longer kernels capture long-term periodic patterns at different time scales in the multivariate time-series data, and a third convolutional layer utilizes kernel sizes of {1, 2}.

5. The computer-implemented method of claim 2, wherein a channel size of a first and second convolutional layer are inverse proportionally reduced according to a predefined function of a maximum kernel size exceeding 8, such that an increase in the maximum kernel size decreases a number of channels, thereby maintaining a bounded total number of parameters and preventing overfitting when using larger multi-scale kernels.

6. The computer-implemented method of claim 1, further comprising:

configuring, by the system, the average pool layer as a global average pooling layer before a last dense layer without a pooling operation between convolution layers.

7. The computer-implemented method of claim 1, wherein the appended LM allows direct interaction between one or more multivariates within a time-step by projecting multivariate variables into an interpretable latent space in which variables with different physical units and scales are jointly normalized.

8. A computer program product for classifying multivariate time-series data, comprising one or more non-transitory computer readable media having instructions stored thereon that, in response to execution, cause a processor to perform operations comprising:

creating a fully convolution network (FCN) comprising a plurality of 1×1 convolutions;

appending a linear mapping layer (LM) to the FCN to create a locally mapped fully convolutional network (LM-FCN), wherein the LM is configured as a per-time-step local mapping that receives, at each time-step, a vector of M variables and computes a mapped vector by multiplying the vector of M variables by a square weight matrix having dimensions M by M and adding a bias vector having M elements, such that the mapped vector enables direct interaction and normalization between the M variables prior to any temporal convolution;

capturing a plurality of features utilizing multi-scale dilated convolutional kernels from the LM-FCN, the multi-scale dilated convolutional kernels including kernels having at least two different dilation factors along a temporal axis to expand an effective receptive field without increasing kernel sizes;

applying an average pool layer comprising a global average pooling operation to the captured plurality of features along the temporal axis of a dilated convolutional kernel within the LM-FCN to produce a length-invariant pooled feature representation while reducing a number of trainable parameters relative to a fully connected layer; and predicting a classification for subsequent multivariate time-series data utilizing the length-invariant pooled feature representation.

9. The computer program product of claim 8, wherein the LM-FCN comprises a three convolutional layer configuration.

10. The computer program product of claim 9, wherein the three convolutional layer configuration has respective numbers of output channels {128, 256, 128}, as determined by a hyper-parameter sensitivity analysis.

11. The computer program product of claim 9, wherein a first and a second convolutional layer both utilize kernel sizes of {3, 8, 40, 80}, each kernel size being assigned to a distinct subset of channels, such that shorter kernels capture local patterns and longer kernels capture long-term periodic patterns at different time scales in the multivariate time-series data, and a third convolutional layer utilizes kernel sizes of {1, 2}.

12. The computer program product of claim 9, wherein a channel size of a first and second convolutional layer are inverse proportionally reduced according to a predefined function of a maximum kernel size exceeding 8, such that an increase in the maximum kernel size decreases a number of channels, thereby maintaining a bounded total number of parameters and preventing overfitting when using larger multi-scale kernels.

13. The computer program product of claim 8, wherein the operations comprise:

configuring the average pool layer as a global average pooling layer before a last dense layer without a pooling operation between convolution layers.

14. The computer program product of claim 8, wherein the appended LM allows direct interaction between one or more multivariates within a time-step by projecting multivariate variables into an interpretable latent space in which variables with different physical units and scales are jointly normalized.

15. A system for classifying multivariate time-series data, the system comprising:

a memory configured to store computer-executable instructions; and a processor configured to execute at least one of the computer-executable instructions that:

creates a fully convolution network (FCN) comprising a plurality of 1×1 convolutions;

appends a linear mapping layer (LM) to the FCN to create a locally mapped fully convolutional network (LM-FCN), wherein the LM is configured as a per-time-step local mapping that receives, at each time-step, a vector of M variables and computes a mapped vector by multiplying the vector of M variables by a square weight matrix having dimensions M by M and adding a bias vector having M elements, such that the mapped vector enables direct interaction and normalization between the M variables prior to any temporal convolution;

captures a plurality of features utilizing multi-scale dilated convolutional kernels from the LM-FCN, the multi-scale dilated convolutional kernels including kernels having at least two different dilation factors along a temporal axis to expand an effective receptive field without increasing kernel sizes;

applies an average pool layer comprising a global average pooling operation to the captured plurality of features along the temporal axis of a dilated convolutional kernel within the LM-FCN to produce a length-invariant pooled feature representation while reducing a number of trainable parameters relative to a fully connected layer; and predicts a classification for subsequent multivariate time-series data utilizing the length-invariant pooled feature representation.

16. The system of claim 15, wherein the LM-FCN comprises a three convolutional layer configuration.

17. The system of claim 16, wherein the three convolutional layer configuration has respective numbers of output channels {128, 256, 128}, as determined by a hyper-parameter sensitivity analysis.

18. The system of claim 16, wherein a first and a second convolutional layer both utilize kernel sizes of {3, 8, 40, 80}, each kernel size being assigned to a distinct subset of channels, such that shorter kernels capture local patterns and longer kernels capture long-term periodic patterns at different time scales in the multivariate time-series data, and a third convolutional layer utilizes kernel sizes of {1, 2}.

19. The system of claim 15, wherein a channel size of a first and second convolutional layer are inverse proportionally reduced according to a predefined function of a maximum kernel size exceeding 8, such that an increase in the maximum kernel size decreases a number of channels, thereby maintaining a bounded total number of parameters and preventing overfitting when using larger multi-scale kernels.

20. The system of claim 15, wherein the at least one of the computer-executable instructions further:

configures the average pool layer as a global average pooling layer before a last dense layer without a pooling operation between convolution layers.

* * * * *